United States Patent
Lv et al.

(10) Patent No.: US 11,467,344 B2
(45) Date of Patent: Oct. 11, 2022

(54) OPTICAL CIRCULATOR HAVING A MAGNETIC RING CIRCUMSCRIBING A WOLLASTON PRISM FLANKED BY FARADAY ROTATORS

(71) Applicant: Molex, LLC, Lisle, IL (US)

(72) Inventors: Hai-Feng Lv, Zhuhai (CN); Zhong-Sheng Wang, Zhuhai (CN)

(73) Assignee: Molex, LLC, Lisle, IL (US)

( * ) Notice: Subject to any disclaimer, the term of this patent is extended or adjusted under 35 U.S.C. 154(b) by 275 days.

(21) Appl. No.: 16/908,746

(22) Filed: Jun. 23, 2020

(65) Prior Publication Data
US 2021/0018688 A1   Jan. 21, 2021

(30) Foreign Application Priority Data
Jul. 16, 2019 (CN) .......................... 201910640797.4

(51) Int. Cl.
*G02B 6/27* (2006.01)
*G02B 27/28* (2006.01)
*G02F 1/09* (2006.01)
*G02F 1/01* (2006.01)

(52) U.S. Cl.
CPC ......... *G02B 6/2746* (2013.01); *G02B 27/285* (2013.01); *G02F 1/0136* (2013.01); *G02F 1/093* (2013.01)

(58) Field of Classification Search
CPC .. G02B 6/2746; G02B 6/3807; G02B 27/285; G02B 27/283; G02F 1/0136; G02F 1/093; G02F 1/0955
See application file for complete search history.

(56) References Cited

U.S. PATENT DOCUMENTS

| | | | | |
|---|---|---|---|---|
| 5,909,310 A | * | 6/1999 | Li | G02F 1/093 359/489.08 |
| 11,047,983 B1 | * | 6/2021 | Prabhakar | G01S 17/58 |
| 11,150,421 B2 | * | 10/2021 | Lv | G02B 6/4208 |
| 2006/0198022 A1 | * | 9/2006 | Pan | G02B 6/2746 359/487.06 |
| 2006/0239607 A1 | * | 10/2006 | Yamamoto | G02B 6/29358 385/20 |
| 2020/0386952 A1 | * | 12/2020 | Lv | G02B 6/3871 |
| 2021/0018688 A1 | * | 1/2021 | Lv | G02B 27/285 |

(Continued)

*Primary Examiner* — Andrew Jordan

(57) ABSTRACT

The present disclosure provides an optical circulator. The optical circulator includes a first integrated module, a second integrated module and a third integrated module which are sequentially connected from front to rear. The first integrated module includes a mating shell, an optical fiber ferrule received in the mating shell and a first birefringence crystal attached to a rear surface of the optical fiber ferrule; the second integrated module comprises a first tube fixed behind the mating shell, a magnetic ring received in the first tube, a Wollaston prism fixed in the magnetic ring, two Faraday rotators respectively provided to both sides of the Wollaston prism, and two collimating lenses respectively provided to both sides of the two Faraday rotators. The third integrated module includes a second tube fixed behind the first tube, a dual fiber pigtail received in the second tube, and a second birefringence crystal attached to a front surface of the dual fiber pigtail. The above-mentioned optical circulator is small in volume and convenient to manufacture.

10 Claims, 6 Drawing Sheets

(56) References Cited

U.S. PATENT DOCUMENTS

| | | | |
|---|---|---|---|
| 2021/0210922 A1* | 7/2021 | Lv | H01S 3/067 |
| 2021/0294037 A1* | 9/2021 | Wu | G02B 6/105 |
| 2021/0333169 A1* | 10/2021 | Lv | G02B 6/4285 |
| 2022/0121045 A1* | 4/2022 | Zheng | G02F 1/093 |

* cited by examiner

OPTICAL CIRCULATOR HAVING A MAGNETIC RING CIRCUMSCRIBING A WOLLASTON PRISM FLANKED BY FARADAY ROTATORS

RELATED APPLICATIONS

This application claims priority to Chinese Application No. 201910640797.4 filed on Jul. 16, 2019, which is incorporated herein by reference in its entirety.

TECHNICAL FIELD

The present disclosure relates to an optical circulator for an optical fiber optical communication system, and particularly to an optical circulator which is small in volume and convenient to manufacture.

BACKGROUND

With the development of optical fiber communication technology, an optical fiber connection device is an essential component for a connection of various optics and modules. Various types of optical fiber connectors are basically identical in basic structure, that is, high-precision coupling tubes are provided with ceramic ferrules therein, fiber end surfaces of the ceramic ferrules are aligned and coupled to achieve a connection of optical signals. The optical circulator is a multi-port optics with non-reciprocal characteristic, and is an important device in bidirectional communication and can separate the forward/reverse transmission. The optical circulator is widely applied in the field of optical communication, such as single-fiber bidirectional communication, add/drop multiplexer, wave combining and dividing, and dispersion compensation and the like.

For an independent optical circulator, it often needs to be mounted in the optical module product, which will occupy a certain volume of the optical module product, increase the difficulty of rolling fiber in the box, and affect the miniaturized design of the optical module product. If the optical circulator is directly inserted into the optical fiber connector, space will be saved, which is beneficial to the spatial distribution and miniaturization design of the optical module product. But for the optical circulator inserted into the optical fiber connector, a volume of the optical circulator must be small enough to achieve insertion mounting. Therefore, with respect to this requirement, it is necessary to provide an optical circulator with a small volume and a high integrated level.

SUMMARY

An object of the present disclosure is to provide an optical circulator which is small in volume and convenient to manufacture.

The present disclosure provides an optical circulator. The optical circulator comprises a first integrated module, a second integrated module and a third integrated module which are engaged as an integral; the first integrated module comprises a mating shell, an optical fiber ferrule received in the mating shell and a first birefringence crystal attached to a rear surface of the optical fiber ferrule; the second integrated module comprises a first tube fixed behind the mating shell, a magnetic ring received in the first tube, a Wollaston prism fixed in the magnetic ring, two Faraday rotators respectively provided to both sides of the Wollaston prism, and two collimating lenses respectively provided to both sides of the two Faraday rotators; the third integrated module comprises a second tube fixed behind the first tube, a dual fiber pigtail received in the second tube, and a second birefringence crystal attached to a front surface of the dual fiber pigtail.

In comparison with a conventional circulator, in the above optical circulator, the first integrated module, the second integrated module and the third integrated module are three independent components. When the above-mentioned optical circulator is manufactured, the above three components can be separately manufactured first, and finally aligned and assembled which is convenient for assembling, that the Wollaston prism, the two Faraday rotators and the two collimating lenses are provided between the two birefringence crystals can shorten the working distance of the beam, thereby reducing the volume of the three components. Moreover, the first integrated module, the second integrated module and the third integrated module may be connected therebetween by bonding, which is simple for operation.

DETAILED DESCRIPTION OF THE PREFERRED EMBODIMENTS

While the present disclosure may be susceptible to embodiments in different forms, there are shown in the figures, and will be described herein in detail, are only specific embodiments, with the understanding that the present disclosure is to be considered as an exemplification of the principles of the present disclosure, and is not intended to limit the present disclosure to that as illustrated.

Hence references to a feature are intended to describe a feature of an embodiment of the present disclosure, not to imply that every embodiment thereof must have the described feature. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the figures, representations of directions such as up, down, left, right, front and rear, used for explaining the structure and movement of the various parts of the present disclosure, are not absolute, but relative. These representations are appropriate when the parts are in the position shown in the figures. If the description of the position of the parts changes, however, these representations are to be changed accordingly.

Hereinafter, embodiments of the present disclosure will be further described in detail in combination with the figures.

Figure 1:
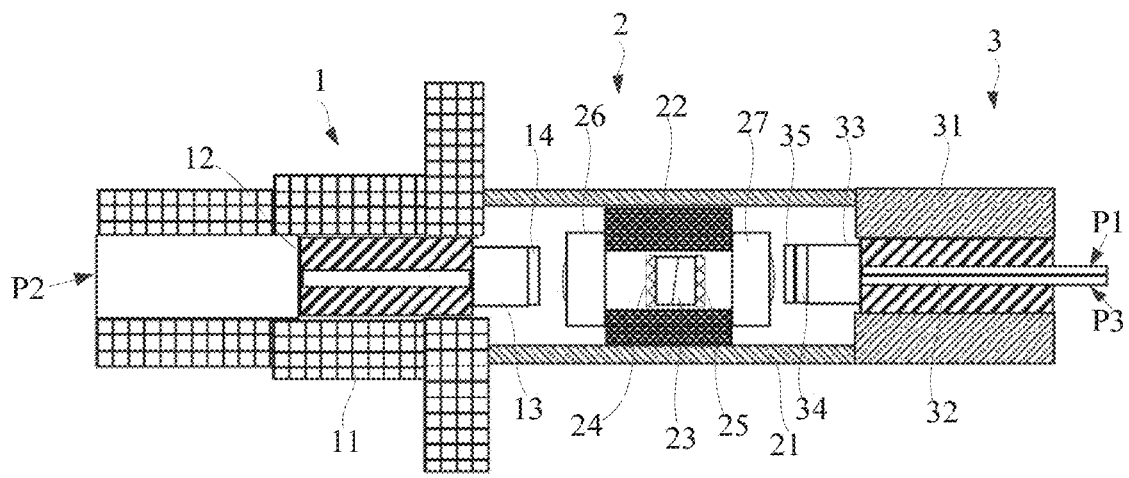
FIG. 1 is a schematic view of a basic structure of an optical circulator of an embodiment of the present disclosure.

Referring to FIG. 1, FIG. 1 illustrates an optical circulator according to an embodiment of the present disclosure, which includes a first integrated module 1, a second integrated module 2 and a third integrated module 3 which are sequentially connected from front to rear. Here, the first integrated module 1 is positioned in the front of the optical circulator, and the third integrated module 3 is positioned in the rear of the optical circulator. That is, the first integrated module 1, the second integrated module 2 and the third integrated module 3 are sequentially arranged along a front-rear direction of the optical circulator.

The above optical circulator is provided with three ports which include a first port P1, a second port P2 and a third port P3. Here, the first port P1 and the third port P3 are positioned at one end of the optical circulator. The second port P2 is positioned at the other end of the optical circulator. The first port P1 is an optical input port. The second port P2 is an optical input/output port. The third port P3 is an optical output port.

The first integrated module 1 includes a mating shell 11, an optical fiber ferrule 12 received in the mating shell 11 and a first birefringence crystal 13 attached to a rear surface of the optical fiber ferrule 12. Specifically, in the embodiment, the first integrated module 1 further includes a first half waveplate 14. The first half waveplate 14 is attached to a rear surface of the first birefringence crystal 13 and occupies a lower half of the rear surface.

The second integrated module 2 includes a first tube 21 fixed behind the mating shell 11, a magnetic ring 22 received in the first tube 21, a Wollaston prism 23 fixed in the magnetic ring 22, and two Faraday rotators respectively provided to both sides of the Wollaston prism 23, and two collimating lenses 26 and 27 respectively provided to both sides of the two Faraday rotators. The two Faraday rotators may be a first Faraday rotator 24 and a second Faraday rotator 25.

The magnetic ring 22 provides the Faraday rotators 24, 25 with a magnetic field so that the Faraday rotators 24, 25 can deflect a direction of a polarized light. The magnetic ring 22 is fixed at a middle position of an inner wall of the first tube 21 to facilitate arrangement of optics. The first tube 21 is preferably a glass pipe.

Figure 2:
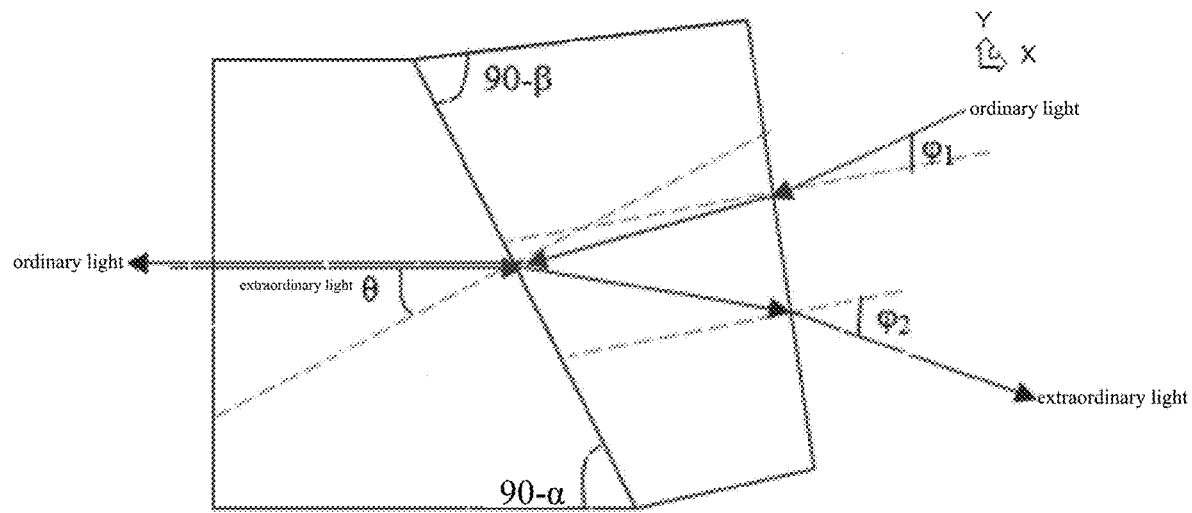
FIG. 2 is a schematic view of the working principle of a Wollaston prism shown in FIG. 1.

Referring to FIG. 2, the Wollaston prism 23 includes two birefringence crystals whose crystal axes are perpendicular to each other. The birefringence crystals are YO4 crystals. The crystal axes of the two YO4 crystals used by the Wollaston prism 23 are on the XY plane, respectively at −45 degrees and 45 degrees to the X axis. The Wollaston prism 23 is used to project an ordinary light and an extraordinary light toward one direction. The ordinary light and the extraordinary light have different exit angles $\varphi 1$ and $\varphi 2$, the exit angles are related to wedge angles $\alpha$ and $\beta$ of the two birefringence crystals. Therefore, it is necessary to determine the angles $\alpha$ and $\beta$ of the wedge angles of the two birefringence crystals through the exit angles $\varphi 1$ and $\varphi 2$ of the polarized light of the dual optical fiber ferrule 12 after collimated by the collimating lens, so as to match them.

The first Faraday rotator 24 and the second Faraday rotator 25 are preferably provided on a front end and a rear end of the Wollaston prism 23, respectively. Polarized directions of the linearly polarized ordinary light and extra ordinary light will rotate clockwise by 45 degrees through the Faraday rotator.

The two collimating lenses include a first collimating lens 26 and a second collimating lens 27. Here, the first collimating lens 26 is provided close to the first integrated module 1, and the second collimating lens 27 is provided close to the third integrated module 3.

The third integrated module 3 includes a second tube 31, a dual fiber pigtail 32 and a second birefringence crystal 33. The second tube 31 is fixed at an end of the first tube 21 away from the mating shell 11. The dual fiber pigtail 32 is received in the second tube 31. The second birefringence crystal 33 is preferably attached to a front surface of the dual fiber pigtail 32.

The third integrated module 3 further includes a second half waveplate 34. The second half waveplate 34 is attached to a front surface of the second birefringence crystal 33 and occupies a lower half of the front surface. The second half waveplate 34 deflects a polarization direction of one of the polarized lights, that the second half waveplate 34 is attached to the second birefringence crystal 33 is convenient to assembly and can attain better optical performance. It is noted that in other embodiments not shown, the first half waveplate 14 and the second half waveplate 34 between the first birefringence crystal 13 and the second birefringence crystal 33 are not necessarily attached to the birefringence crystal, but can also be respectively attached to the first collimating lens 26 and the second collimating lens 27 instead.

The third integrated module 3 preferably further includes a compensation film 35. The compensation film 35 is attached to the front surface of the second birefringence crystal 33 and occupies an upper half of the front surface. The compensation film 35 is used to make an optical path of the ordinary light and an optical path of the extraordinary light consistent, so as to reduce the influence of polarization dispersion in single-mode fiber.

Figure 3:
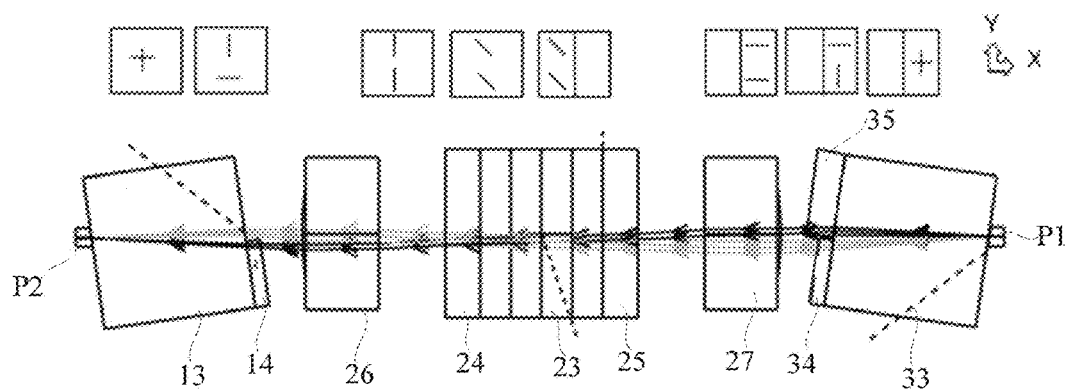
FIG. 3 is a beam path diagram from a first port to a second port of the optical circulator shown in FIG. 1.
Figure 4:
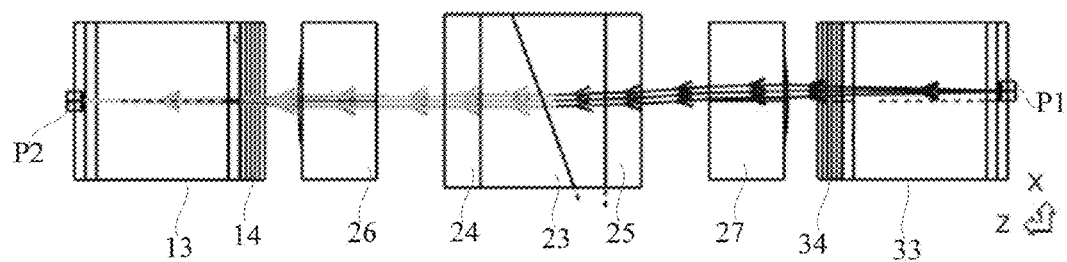
FIG. 4 is a beam path diagram from the first port to the second port of the optical circulator shown in FIG. 1 from another angle.

Referring to FIG. 3 and FIG. 4, the beam path diagram and polarization change diagram of the optical circulator from the first port P1 to the second port P2 is illustrated. After passing through the second birefringence crystal 33, an incident light is divided into two beams, i.e. an ordinary light and an extraordinary light, the ordinary light is positioned above and the extraordinary is positioned below. After the extraordinary light passes through the second half waveplate 34, the polarization direction of the extraordinary light rotates 90 degrees so as to be the same as the polarization direction of the ordinary light. The polarized lights are collimated by the second collimating lens 27, and the collimated lights rotate clockwise by 45 degrees after passing through the second Faraday rotator 25. After passing the Wollaston prism 23, the lights are refracted. The collimated lights after refracted pass through the first Faraday rotator 24 and rotate clockwise by 45 degrees, the polarization directions change from horizontal to vertical. The vertically polarized lights converges through the first collimating lens 26, after the vertical polarized light positioned below passes through the first half waveplate 14, the polarization direction of the vertical polarized light positioned below becomes horizontal and becomes an ordinary light for the first birefringence crystal 13, and the vertical polarized light positioned above does not pass through the first half waveplate 14. In this way, the initial ordinary light turns to the extraordinary light, and the initial extraordinary light turns to the ordinary light. After passing through the first birefringence crystal 13, the lights converge to the second port P2.

Figure 5:
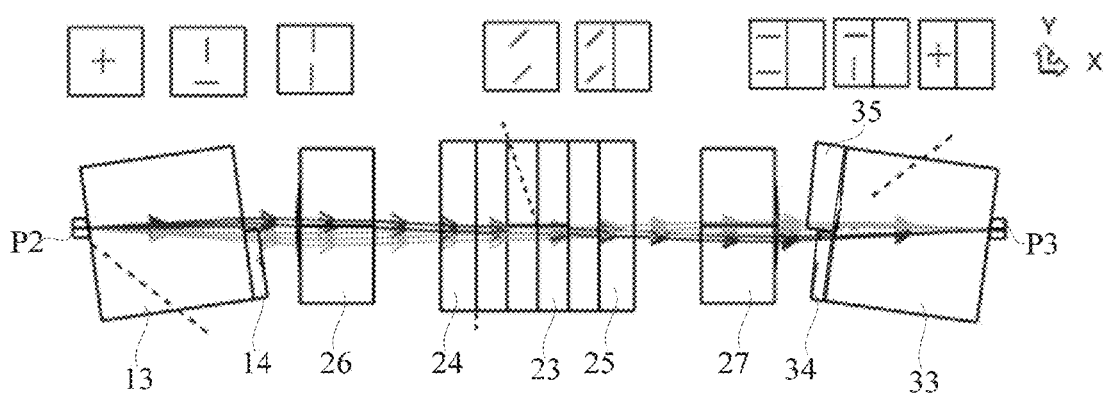
FIG. 5 is a beam path diagram from the second port to a third port of the optical circulator shown in FIG. 1.
Figure 6:
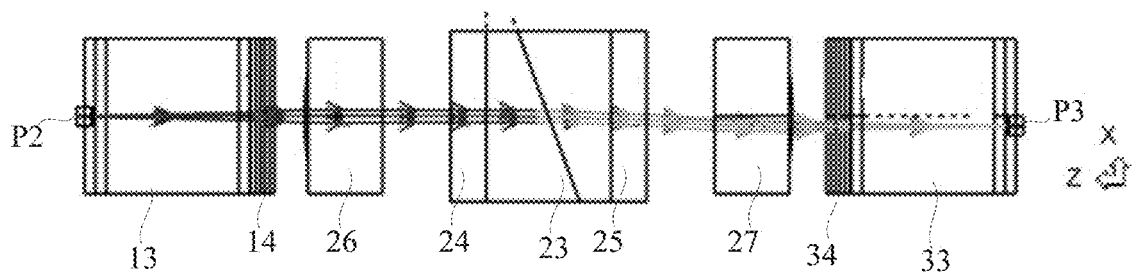
FIG. 6 is a beam path diagram from the second port to the third port of the optical circulator shown in FIG. 1 from another angle.

Referring to FIG. 5 and FIG. 6, the beam path diagram and polarization change diagram of the optical circulator of the embodiment from the second port P2 to the third port P3 is illustrated. After passing through the first birefringence crystal 13, the incident light of the second port P2 is divided into two beams, i.e. an ordinary light and an extraordinary light, the ordinary light is positioned below, and after passing through the first half waveplate 14, the ordinary light turns to a vertical extraordinary light. The polarized lights are collimated after passing through the first collimating lens 26, then pass through the first Faraday rotator 24 and rotate clockwise by 45 degrees. After passing the Wollaston prism 23, the lights are refracted. The collimated lights after refracted pass through the second Faraday rotator 25 and rotate clockwise by 45 degrees, then enter into the second collimating lens 27 and becomes two convergent lights, the horizontally polarized light positioned below passes through the second half waveplate 34, the polarization direction of the horizontally polarized light positioned below rotates 90 degrees to become a vertically polarized light. In this way, the initial ordinary light turns to the extraordinary light, the initial extraordinary light turns to the ordinary light, and the two polarized lights converge to the third port P3 and output through one fiber pigtail of the dual fiber pigtail 32.

Figure 7:
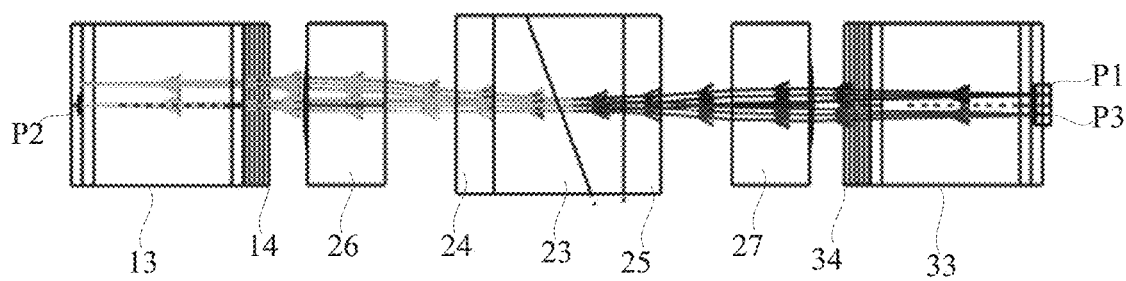
FIG. 7 is an isolated beam path diagram of a reverse beam entering from the third port of the optical circulator shown in FIG. 1, for sake of comparison, the beam path from the first port to the second port is also shown as reference.

FIG. 7 is an isolated beam path diagram of a reverse light entering from the third port P3 of the optical circulator of the embodiment. For convenience of comparison, the beam path from the first port P1 to the second port P2 as shown in FIG. 4 is also drawn in FIG. 7. As can be seen from FIG. 7, the reverse light entering from the third port P3 passes through the Wollaston prism 23, and the angle of the reverse light will also be refracted. Because there is a gap between the two fibers of the dual fiber pigtail 32, there is an angle between an incident light entering from third port P3 and an incident light entering from the first port P1, so there will be a corresponding angle between the exit lights of the Wollaston prism 23, which can be seen from FIG. 7 that, when the reverse light entering from the third port P3 reaches the left end of FIG. 7, the reverse light entering from the third port P3 is positioned above the second port P2 and spaced apart from the second port P2 by a certain distance. Therefore, the reverse light entering from the third port P3 cannot enter into the second port P2, so the optical circulator achieves the function of reverse isolation.

Figure 8:
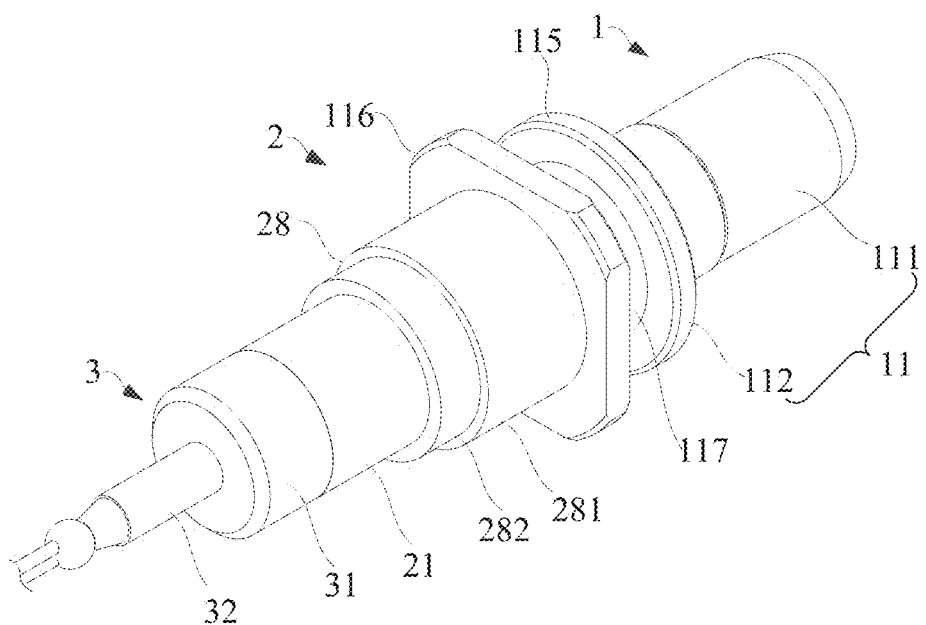
FIG. 8 is a perspective view of a specific embodiment of the optical circulator shown in FIG. 1.
Figure 9:
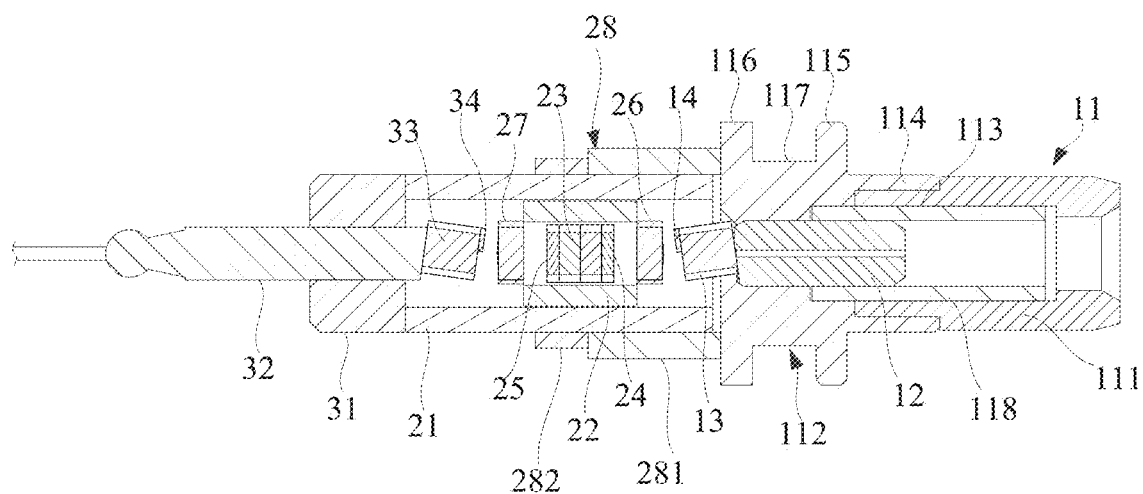
FIG. 9 is a cross-sectional view of the optical circulator shown in FIG. 8.
Figure 10:
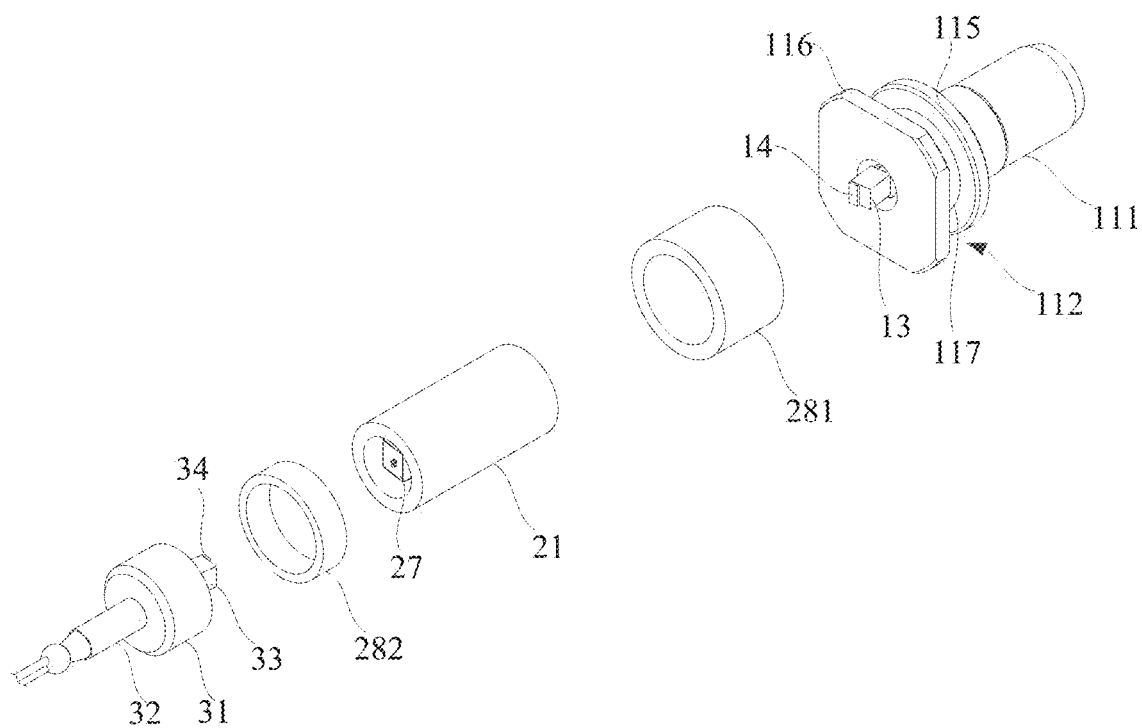
FIG. 10 is an exploded perspective view of the optical circulator shown in FIG. 8.

Referring to FIG. 8, FIG. 9 and FIG. 10, specifically, in the embodiment, the mating shell 11 includes a cap 111 positioned at a front end and a flange 112 provided behind the cap 111. The cap 111 is provided with a boss 113 protruding rearwardly, and the flange 112 is provided with a hollow receiving portion 114 protruding forwardly. The boss 113 and hollow receiving portion 114 cooperate with each other to connect with each other, which can enhance the stability of the connection between the cap 111 and the flange 112.

An outer surface of the flange 112 is preferably provided with at least one protruding edge protruding outwardly, and the protruding edge is used to be fixed together with another mating optic component (not shown) to prevent falling off. Specifically, the flange 112 includes a cylinder 117 which is hollow and a first protruding edge 115 and a second protruding edge 116 which are respectively provided at a front end and a rear end of the cylinder 117. Here, a size of a hollow diameter of the cylinder 117 matches a diameter of the optical fiber ferrule 12. A rear wall surface of the second protruding edge 116 provides a mounting surface for mounting the second integrated module 2.

Moreover, in a direction perpendicular to an axial direction of the optical circulator, the first protruding edge 115 and the second protruding edge 116 protrude from an outside of the entire optical circulator. A cross section of the first protruding edge 115 is circular, and a cross section of the second protruding edge 116 is square. When the optical circulator is mated with another mating optics, the first protruding edge 115 which is circular can achieve fixation in the front-rear direction, and the second protruding edge 116 which is square can prevent the optical circulator from rotating and causing damage to the optical fiber.

Here, an inner sleeve 118 is preferably inserted between the cap 111 and the flange 112. A front end of the optical fiber ferrule 12 is received in the inner sleeve 118. The inner sleeve 118 forms a mating cavity in front of the optical fiber ferrule 12 for alignment with the optical fiber ferrule (not shown) of another mating optics. An inner diameter of the inner sleeve 118 matches the diameter of the optical fiber ferrule 12. Here, the inner sleeve 118 is preferably a steel pipe. Here, the optical fiber ferrule 12 has preferably a beam expansion fiber therein, so that a wider working beam can be obtained.

Referring to FIG. 8, the second integrated module 2 further includes at least one fixing ring 28. The fixing ring 28 sheathes an outer periphery of the first tube 21. An inner diameter of the fixing ring 28 matches an outer diameter of the first tube 21. A front surface of the fixing ring 28 and a rear surface of the mating shell 11 are fixed together by bonding. Specifically, the front end of the fixing ring 28 is connected with the second protruding edge 116 of the flange 112. Here, the fixing ring 28 and the first tube 21 can be axially aligned and a mounting position between the fixing ring 28 and the first tube 21 can be adjusted back and forth along the axial direction before the assembling and fixing is completed, and in turn positions of the first integrated module 1 and the second integrated module 2 of the optical circulator in the front-rear direction can be adjusted, after the adjustment is completed, the fixing ring 28 and the first tube 21 are fixed together by a fixing means such as bonding or laser welding.

Specifically, the fixing ring 28 in the embodiment includes a first ring 281 and a second ring 282. A front surface of the first ring 281 abuts against the mating shell 11, and the front surface of the first ring 281 and the mating shell 11 are fixed by bonding. A rear surface of the first ring 281 is attached to a front surface of the second ring 282.

The front surface of the first ring 281 is fixed to the rear surface of the mating shell 11 by bonding after the first integrated module 1 and the second integrated module 2 are axially aligned with each other, so as to ensure the axial alignment of the first integrated module 1 and the second integrated module 2. After the relative positions of the first tube 21 and the optical fiber ferrule 12 are adjusted to obtain better performance parameters, an inner wall of the second ring 282 is fixed on an outer peripheral surface of the first tube 21 by bonding, thereby fixing the position of the first tube 21 in the front-rear direction. Such a design using the second ring 282 has better fixing effect on the first tube 21 in the front-rear direction.

Figure 11:
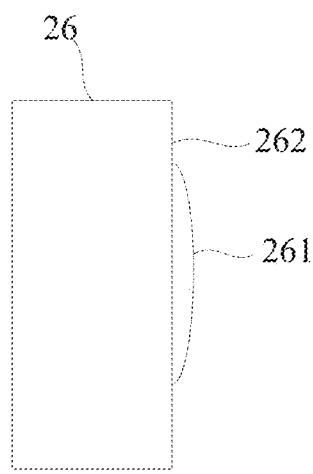
FIG. 11 is a structural diagram of a first collimating lens shown in FIG. 1.

Referring to FIG. 9 and FIG. 11, the first collimating lens 26 is attached to a front surface of the magnetic ring 22, and the second collimating lens 27 is attached to a rear surface of the magnetic ring 22, thereby conveniently assembling into an entire optical module. It is noted that, in some embodiments not shown, the first collimating lens 26 and the second collimating lens 27 can also be received in the magnetic ring 22 together with the Faraday rotating plates 24 and 25, etc.

One side of the first collimating lens 26 includes a protruding surface 261 and a connection plane 262 positioned around an outer periphery of the protruding surface 261. A diameter of the protruding surface 261 is slightly smaller than a diameter of the first collimating lens 26. In some embodiments, the connection plane 262 can be used to bond with the front surface of the magnetic ring 22 together.

Figure 12:
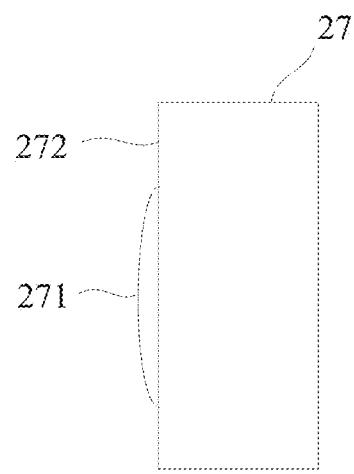
FIG. 12 is a structural diagram of a second collimating lens shown in FIG. 1.

Referring to FIG. 9 and FIG. 12, similarly, one side of the second collimating lens 27 includes a protruding surface 271 and a connection plane 272 positioned around an outer periphery of the protruding surface 271. The connection plane 272 can be used to bond with the rear surface of the magnetic ring 22.

Please referring to FIG. 9 again, an inner diameter of the second tube 31 matches a diameter of the dual fiber pigtail 32 to stably fix the dual fiber pigtail 32. Specifically, the second tube 31 is a glass pipe. During assembling, after the second tube 31 is axially aligned with the second integrated module 2, a front surface of the second tube 31 is fixed to a rear surface of the first tube 21 by bonding, thereby ensuring the axial alignment of the second integrated module 2 and the third integrated module 3, and the dual fiber pigtail 32 is moved back and forth in the second tube 31 to obtain better performance parameters and then the dual fiber pigtail 32 is fixed to the second tube 31 by bonding.

In the above optical circulator, the first integrated module 1, the second integrated module 2 and the third integrated module 3 are three independent components. When the above-mentioned optical circulator is manufactured, the above three components can be separately manufactured first, and finally assembled and fixed together after axial alignment and position adjustment in the front-rear direction, which is convenient for operation. Moreover, that the Wollaston prism 23, the two Faraday rotators 24, 25 and the two collimating lenses 26, 27 are provided between the two birefringence crystals 13, 33 can shorten the working distance of the beam, thereby reducing the volume of the three components.

And during assembling, if it needs to adjust the relative positions of the first integrated module 1, the second integrated module 2 and the third integrated module 3, a distance between the first integrated module 1 and the second integrated module 2 in the front-rear direction can be adjusted and an axial alignment can be achieved by adjusting the first ring 281 and the second ring 282. An axial alignment can also be achieved by adjusting the positions of the second tube 31 and the first tube 21. Therefore, the relative positions of the first integrated module 1, the second integrated module 2 and the third integrated module 3 can be easily adjusted, which is beneficial to manufacturing and assembling and improves the coupling efficiency of the above optical circulator.

Although the present disclosure has been described with reference to several exemplary embodiments, it should be understood that the terminology used is illustrative and exemplary rather than limiting. Since the present disclosure can be embodied in various forms without departing from the spirit or essence of the present disclosure, it should be understood that the above embodiments are not limited to any of the foregoing details, but should be widely interpreted within the spirit and scope defined by the appended claims, therefore, all variations and modifications falling within the scope of the claims or equivalent ranges of the claims should be covered by the appended claims.

What is claimed is:

1. An optical circulator comprising a first integrated module, a second integrated module and a third integrated module which are sequentially connected from front to rear;
the first integrated module comprising a mating shell, an optical fiber ferrule received in the mating shell and a first birefringence crystal attached to a rear surface of the optical fiber ferrule;
the second integrated module comprising a first tube fixed behind the mating shell, a magnetic ring received in the first tube, a Wollaston prism fixed in the magnetic ring, two Faraday rotators respectively provided to both sides of the Wollaston prism, and two collimating lenses respectively provided to both sides of the two Faraday rotators;
the third integrated module comprising a second tube fixed behind the first tube, a dual fiber pigtail received in the second tube, and a second birefringence crystal attached to a front surface of the dual fiber pigtail.

2. The optical circulator according to claim 1, wherein the optical circulator further comprises a first half waveplate and a second half waveplate positioned between the first birefringence crystal and the second birefringence crystal.

3. The optical circulator according to claim 2, wherein the first half waveplate is attached to a rear surface of the first birefringence crystal, and the second half waveplate is attached to a front surface of the second birefringence crystal.

4. The optical circulator according to claim 3, wherein the third integrated module further comprises a compensation film, the compensation film is attached to the front surface of the second birefringence crystal and arranged with the second half waveplate side by side.

5. The optical circulator according to any one of claim 1, wherein the mating shell comprises a cap positioned at a front end and a flange positioned behind the cap, the cap extends rearwardly to form a boss, the flange is provided with a hollow receiving portion, the boss and the hollow receiving portion connect with each other.

6. The optical circulator according to claim 5, wherein the flange comprises a cylinder and a first protruding edge and a second protruding edge protruding outwardly from the cylinder, a cross section of the first protruding edge is circular, a cross section of the second protruding edge is square.

7. The optical circulator according to claim 5, wherein the mating shell further comprises an inner sleeve mounted between the cap and the flange, a front end of the optical fiber ferrule is received in the inner sleeve, the inner sleeve forms a mating cavity in front of the optical fiber ferrule.

8. The optical circulator according to any one of claim 1, wherein the second integrated module further comprises a first ring, the first ring sheathes an outer periphery of the first tube, and a front end of the first ring is connected with the mating shell.

9. The optical circulator according to claim 8, wherein the second integrated module further comprises a second ring attached to a rear surface of the first ring, and the second ring also sheathes the outer periphery of the first tube, an inner wall of the second ring is fixed to the first tube by bonding.

10. The optical circulator according to any one of claim 1, wherein the two collimating lenses are attached to a front end and a rear end of the magnetic ring, respectively.

* * * * *